(12) United States Patent
Tsubaki et al.

(10) Patent No.: US 12,531,188 B2
(45) Date of Patent: Jan. 20, 2026

(54) ELECTROLYTIC CAPACITOR

(71) Applicant: Panasonic Intellectual Property Management Co., Ltd., Osaka (JP)

(72) Inventors: Yuichiro Tsubaki, Kyoto Fu (JP); Daisuke Kubo, Osaka Fu (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 103 days.

(21) Appl. No.: 18/014,970

(22) PCT Filed: Jul. 29, 2021

(86) PCT No.: PCT/JP2021/028118
§ 371 (c)(1),
(2) Date: Jan. 6, 2023

(87) PCT Pub. No.: WO2022/025189
PCT Pub. Date: Feb. 3, 2022

(65) Prior Publication Data
US 2023/0260716 A1    Aug. 17, 2023

(30) Foreign Application Priority Data
Jul. 31, 2020    (JP) .................. 2020-130972

(51) Int. Cl.
*H01G 9/035*    (2006.01)
*H01G 9/145*    (2006.01)
*H01G 9/15*    (2006.01)

(52) U.S. Cl.
CPC ............. *H01G 9/035* (2013.01); *H01G 9/145* (2013.01); *H01G 9/151* (2013.01)

(58) Field of Classification Search
None
See application file for complete search history.

(56) References Cited

U.S. PATENT DOCUMENTS

2012/0300368 A1    11/2012    Matsuura et al.
2018/0158619 A1    6/2018    Tsubaki et al.
(Continued)

FOREIGN PATENT DOCUMENTS

JP    2006-120830 A    5/2006
JP    2014-195116 A    10/2014
(Continued)

OTHER PUBLICATIONS

International Search Report dated Oct. 19, 2021 issued in International Patent Application No. PCT/JP2021/028118, with English translation.

*Primary Examiner* — Eric W Thomas
(74) *Attorney, Agent, or Firm* — Rimon P.C.

(57) ABSTRACT

A disclosed electrolytic capacitor includes a capacitor element, and a liquid component. The capacitor element includes an anode body having a dielectric layer at a surface of the anode body, and a conductive polymer compound covering at least part of the dielectric layer. The liquid component contains an acid component, a base component, and a solvent. The solvent includes an organic compound having a hydroxy group, and the acid component includes an organic carboxylic acid compound. The base component includes at least one selected from the group consisting of a primary amine compound and a secondary amine compound.

17 Claims, 2 Drawing Sheets

(56) References Cited

U.S. PATENT DOCUMENTS

| | | | |
|---|---|---|---|
| 2018/0197685 A1* | 7/2018 | Tsubaki | ................. H01G 9/145 |
| 2018/0218844 A1 | 8/2018 | Sato et al. | |
| 2019/0006112 A1* | 1/2019 | Aoyama | ............. H01G 9/0425 |
| 2020/0211785 A1 | 7/2020 | Tsubaki et al. | |

FOREIGN PATENT DOCUMENTS

| | | |
|---|---|---|
| JP | 2020-107791 A | 7/2020 |
| WO | 2017/017947 A1 | 2/2017 |
| WO | 2017/026378 A1 | 2/2017 |

* cited by examiner

ELECTROLYTIC CAPACITOR

CROSS-REFERENCE OF RELATED APPLICATIONS

This application is the U.S. National Phase under 35 U.S.C. § 371 of International Patent Application No. PCT/JP2021/028118, filed on Jul. 29, 2021, which in turn claims the benefit of Japanese Patent Application No. 2020-130972, filed on Jul. 31, 2020, the entire disclosures of which Applications are incorporated by reference herein.

TECHNICAL FIELD

The present invention relates to an electrolytic capacitor including a conductive polymer compound and a liquid component.

BACKGROUND ART

An electrolytic capacitor includes a capacitor element, and a liquid component (liquid electrolyte). The capacitor element includes an anode body having a dielectric layer at a surface of the anode body, and a conductive polymer compound covering at least part of the dielectric layer. The liquid component contains an acid component, a base component, and a solvent. Various studies have been made on the liquid component.

Patent Literature 1, relating to the liquid electrolyte, proposes using ethylene glycol and the like as the solvent, ammonia as the base component, and azelaic acid and the like as the acid component.

Patent Literature 2 proposes using a tertiary amine, such as triethylamine, or a quaternary ammonium, such as 1,2-dimethylimidazolinium, as the base component of the liquid electrolyte, and including an antioxidant, such as phenol, in the liquid electrolyte.

CITATION LIST

Patent Literature

Patent Literature 1: International Publication WO 2017/026378
Patent Literature 2: Japanese Laid-Open Patent Publication No. 2006-120830

SUMMARY OF INVENTION

Technical Problem

In the liquid component, when an organic compound having a hydroxy group and an organic carboxylic acid compound having a carboxy group are both present, the amount of the organic carboxylic acid compound in the liquid component could decrease due to an esterification reaction. In such a case, it may occur that the pH of the liquid component increases, the dopant of the conductive polymer is de-doped, and the ESR of the electrolytic capacitor rises. In addition, due to the decrease of the organic carboxylic acid compound, the layer repair function of the liquid component may deteriorate, and the leakage current of the electrolytic capacitor may increase.

When ammonia, a tertiary amine, or a quaternary ammonium is used as the base component of the liquid component, or when an antioxidant, such as phenol, is included the liquid component, the leakage current of the electrolytic capacitor may increase.

Solution to Problem

One aspect of the present invention relates to an electrolytic capacitor. The electrolytic capacitor includes: a capacitor element; and a liquid component, wherein the capacitor element includes an anode body having a dielectric layer at a surface of the anode body, and a conductive polymer compound covering at least part of the dielectric layer, the liquid component contains an acid component, a base component, and a solvent, the solvent includes an organic compound having a hydroxy group, the acid component includes an organic carboxylic acid compound, and the base component includes at least one selected from the group consisting of a primary amine compound and a secondary amine compound.

Another aspect of the present invention relates to another electrolytic capacitor. The electrolytic capacitor includes: a capacitor element; and a liquid component, wherein the capacitor element includes an anode body having a dielectric layer at a surface of the anode body, and a conductive polymer compound covering at least part of the dielectric layer, the liquid component contains an acid component, a base component, a solvent, and an antioxidant, and the base component includes at least one selected from the group consisting of a primary amine compound and a secondary amine compound.

Advantageous Effects of Invention

According to the present invention, with respect to the electrolytic capacitor, it is possible to suppress the rise in ESR and suppress the increase in leakage current.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
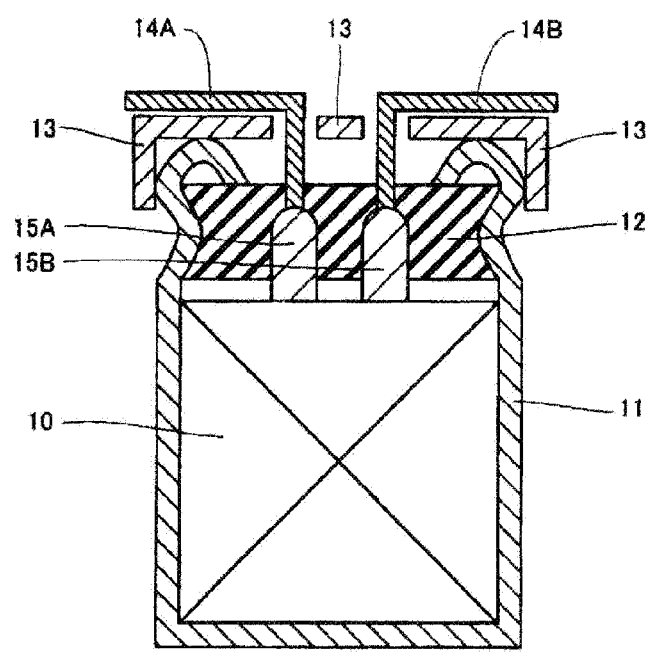
FIG. 1 A schematic cross-sectional view of an electrolytic capacitor according to one embodiment of the present invention.

An electrolytic capacitor according to one embodiment of the present invention includes a capacitor element, and a liquid component. The capacitor element includes an anode body having a dielectric layer at a surface of the anode body, and a conductive polymer compound covering at least part of the dielectric layer. The liquid component contains an acid component, a base component, and a solvent. The solvent includes an organic compound having a hydroxy group. The acid component includes an organic carboxylic acid compound. The base component includes at least one selected from the group consisting of a primary amine compound and a secondary amine compound (hereinafter sometimes referred to as a primary amine compound etc.)

In the liquid component, when an organic compound having a hydroxy group and an organic carboxylic acid compound having a carboxy group are both present, the amount of the organic carboxylic acid compound in the liquid component could decrease due to an esterification reaction. In such a case, it may occur that the pH of the liquid component increases, the dopant of the conductive polymer is de-doped, and the ESR of the electrolytic capacitor rises. In addition, due to the decrease of the organic carboxylic acid compound, the layer repair function (repair function to repair a defect in the dielectric layer) of the liquid component may deteriorate, and the leakage current of the electrolytic capacitor may increase.

In contrast, in the present invention, it was found that when at least one selected from the group consisting of a primary amine compound and a secondary amine compound (hereinafter sometimes referred to as a primary amine compound etc.) is contained as the base component in the liquid component, the rise in ESR can be suppressed, and the increase in leakage current can be suppressed.

When the liquid component contains a primary amine compound etc., as compared to when the liquid component contains at least one of a tertiary amine and ammonia, the amount of the organic carboxylic acid compound remaining undissociated in the liquid component is reduced, and the above esterification reaction is suppressed. Therefore, the decrease of the organic carboxylic acid compound due to the above esterification reaction is suppressed, and even in a long time use, the rise in ESR due to the dedoping of the dopant of the conductive polymer is suppressed. The layer repair function of the liquid component is sufficiently maintained, and the increase in leakage current is suppressed.

When the liquid component contains a primary amine compound etc., as compared to when the liquid component contains a quaternary ammonium, the pH of the liquid component is maintained low, the dedoping of the dopant from the conductive polymer compound is suppressed, and the rise in ESR is suppressed.

When the liquid component contains a primary amine compound etc., as compared to when the liquid component contains ammonia, a tertiary amine, and/or a quaternary ammonium, the stability (e.g., thermal stability) of the liquid component is appropriately ensured. As a result, the fluctuations in the amounts of the acid and base components dissolved in the liquid component are suppressed, the layer repair function of the liquid component is stably maintained, and the increase in leakage current is suppressed.

Furthermore, in a medium- to high-voltage type electrolytic capacitor (e.g., having a rated voltage of 160 V or higher) in which the dielectric layer is covered with a conductive polymer compound, especially, the leakage current is likely to increase. Therefore, the effect of the present invention produced by containing a primary amine compound etc. in the liquid component to suppress the increase in leakage current can be remarkably obtained.

The liquid component may also contain an antioxidant. When the liquid component contains a primary amine compound etc., as compared to when the liquid component contains ammonia, a tertiary amine, and/or a quaternary ammonium, the leakage current is small, and the increase in leakage current due to the addition of an antioxidant in the liquid component is suppressed.

An electrolytic capacitor according to another embodiment of the present invention includes a capacitor element, and a liquid component. The capacitor element includes an anode body having a dielectric layer at a surface of the anode body, and a conductive polymer compound covering at least part of the dielectric layer. The liquid component contains an acid component, a base component, a solvent, and an antioxidant. The base component includes at least one selected from the group consisting of a primary amine compound and a secondary amine compound (hereinafter sometimes referred to as a primary amine compound etc.). The antioxidant is used for the purpose of suppressing the deterioration of the conductive polymer compound due to oxidation.

When the liquid component contains an antioxidant, the layer repair function of the liquid component deteriorates due to the influence of the antioxidant, and the leakage current of the electrolytic capacitor increases in some cases.

When the liquid component contains a primary amine compound etc., as compared to when the liquid component contains ammonia, a tertiary amine, and/or a quaternary ammonium, the leakage current is small, and the increase in leakage current due to the addition of an antioxidant in the liquid component is suppressed. Even when an antioxidant is used, in a medium- to high-voltage type electrolytic capacitor (e.g., having a rated voltage of 160 V or higher), the effect produced by containing a primary amine compound etc. in the liquid component to suppress the increase in leakage current can be remarkably obtained.

Furthermore, when the liquid component contains a primary amine compound etc., as compared to when the liquid component contains a quaternary ammonium, the pH of the liquid component is maintained low, the dedoping of the dopant from the conductive polymer compound is suppressed, and the rise in ESR is suppressed.

As described above, when the liquid component contains at least one of a primary amine compound and a secondary amine compound, as the base component, the rise in ESR is suppressed, and the increase in leakage current is suppressed.

The organic compound having a hydroxy group preferably includes a glycerin compound. The organic carboxylic acid compound is more likely to interact with the hydroxy group of a glycerin compound than with a phenolic antioxidant having a hydroxy group bonded to an aromatic ring. When the solvent includes a glycerin compound, the influence of the organic carboxylic acid compound on the phenolic antioxidant is reduced, and the function of the phenolic antioxidant to suppress the oxidative deterioration of the conductive polymer compound tends to be exhibited efficiently.

Moreover, the glycerin compound has a high boiling point, and the permeation from the sealing part of the electrolytic capacitor to the outside is suppressed. The fluctuations in the amount of the glycerin compound are small, the stability of the liquid component containing a primary amine compound etc. is further enhanced, the amounts of the acid and base components to dissociate are maintained stably, the stability of the layer repair function of the liquid component is further improved, and the increase in leakage current is further suppressed.

In the following, the liquid component will be described in detail.

(Liquid Component)

The liquid component is in contact with the dielectric layer directly or via the conductive polymer compound. It suffices as long as the liquid component is present, together with the conductive polymer compound, between the dielectric layer of the anode body and the cathode body. The liquid component improves the contact between the dielectric layer and the conductive polymer compound, and has a layer repair function. For the analysis of the liquid component, gas chromatography/mass spectrometry (GC/MS) and the like are used.

Preferable examples of the liquid component include a component that is liquid at room temperature (25° C.) (a component that is not solidified). Preferable examples of the solvent for such a liquid component include a solvent that is liquid at room temperature (25° C.). The liquid component may be a component that is liquid at an exemplary temperature during the use of the electrolytic capacitor. Preferable examples of the solvent for such a liquid component include a solvent that is liquid at an exemplary temperature during the use of the electrolytic capacitor.

(Base Component)

The base component includes at least one of a primary amine compound and a secondary amine compound. It is preferable that the total of the primary and secondary amine compounds occupies the largest proportion in the base component. The whole base component may be at least one of the primary amine compound and the secondary amine compound. The base component may include a small amount of another component other than the primary and secondary amine compounds. The sum of the proportions of the ammonia, the tertiary amine, and the quaternary ammonium in the base component is, for example, 2 mass % or less.

The primary amine compound preferably includes at least one selected from the group consisting of an aliphatic primary amine compound and an aromatic primary amine compound. The secondary amine compound preferably includes at least one selected from the group consisting of an aliphatic secondary amine compound, an aromatic secondary amine compound, and a heterocyclic secondary amine compound. The primary amine compound and the secondary amine compound may be each used singly or in combination of two or more kinds.

In the aliphatic primary amine compound, two hydrogen atoms and one aliphatic group are bonded to the nitrogen atom. In the aliphatic secondary amine compound, one hydrogen atom and two aliphatic groups are bonded to the nitrogen atom. The two aliphatic groups of the aliphatic secondary amine compound may be the same as or different from each other. The heterocyclic secondary amine compound is a heterocyclic compound (heterocyclic compound) having a nitrogen atom as a heteroatom, and one hydrogen atom is bonded to the nitrogen atom included in the ring. The heteroatom may include an atom other than the nitrogen atom (e.g., oxygen atom). The number of ring members of the heterocycle is, for example, 3 or more and 6 or less. The heterocycle preferably does not have an unsaturated bond.

The aliphatic group includes a chain or cyclic (except aromacyclic) hydrocarbon group. In view of reducing the influence of steric hindrance, the aliphatic group may be a straight chain hydrocarbon group. The hydrocarbon group may be a saturated hydrocarbon group, and may be an unsaturated hydrocarbon group. The aliphatic group may have an ether bond. Part of the hydrogen atoms bonded to the carbon atoms of the hydrocarbon group may be substituted by a substituent other than hydrogen atom. Examples of the substituent include a hydroxy group, a nitro group, and a phenyl group. The hydrocarbon group includes, for example, an alkyl group, a cycloalkyl group, and an alkenyl group. In view of securing the electron-donating property, reducing the influence of steric hindrance, and the like, the hydrocarbon group (e.g., alkyl group) may have, for example, 1 to 6 carbon atoms, 1 to 4 carbon atoms, or 3 to 6 carbon atoms.

The aliphatic primary amine compound includes, for example, an alkylamine, a cycloalkylamine, a polyamine, an etheramine, and derivatives thereof. The alkylamine includes methylamine, ethylamine, n-propylamine, isopropylamine, n-butylamine, isobutylamine, t-butylamine, and derivatives thereof. The cycloalkylamine includes cyclohexylamine, amantadine, and derivatives thereof. The polyamine includes ethylenediamine, hexamethylenediamine, spermidine, spermine, and derivatives thereof. In particular, in view of easy availability, relatively inexpensive prices, and the like, the aliphatic primary amine compound preferably includes ethylamine, isopropylamine, t-butylamine, ethylenediamine, and hexamethylenediamine.

The aliphatic secondary amine compound includes, for example, a dialkylamine and a derivative thereof. The two alkyl groups may be the same as or different from each other. One of the two alkyl groups may be a cycloalkyl group, and may have an ether bond. The dialkylamine includes dimethylamine, diethylamine, N-methylethylamine, N-methylpropylamine, N-methylisopropylamine, N-ethylpropylamine, N-ethylisopropylamine, dipropylamine, diisopropylamine, dibutylamine, N-ethylisobutylamine, di-tert-butylamine, and derivatives thereof. In particular, in view of easy availability, relatively inexpensive prices, and the like, the aliphatic secondary amine compound preferably includes diethylamine, diisopropylamine, and dibutylamine.

In the aromatic primary amine compound, two hydrogen atoms and one aromatic group are bonded to the nitrogen atom. In the aromatic secondary amine compound, one hydrogen atom, two aromatic groups or one aromatic group, and one aliphatic group are bonded to the nitrogen atom. In the aromatic secondary amine compound, the two aromatic groups may be the same as or different from each other. The aliphatic group can include the aliphatic groups mentioned above for the aliphatic amine compound.

The aromatic group includes at least one aromatic ring, and includes, for example, an aryl group, an aralkyl group, and the like. The aryl group includes a phenyl group, 2-methylphenyl group, 3-methylphenyl group, 4-methylphenyl group, 1-naphthyl group, 2-naphthyl group, xylyl group, and the like. The aralkyl group includes a benzyl group, 2-phenylethyl group, and the like. Part of the hydrogen atoms bonded to the carbon atoms of the aromatic group may be substituted by a substituent other than hydrogen atom. Examples of the substituent include a hydroxy group, a nitro group, and a phenyl group.

The aromatic primary amine compound include, for example, an arylamine, an aralkylamine, and derivatives thereof. The arylamine includes aniline, 2-methylaniline, 3-methylaniline, 4-methylaniline, 1-naphthylamine, 2-naphthylamine, and derivatives thereof. The aralkylamine includes benzylamine, phenylethylamine, and derivatives thereof. In particular, in view of easy availability, relatively inexpensive prices, and the like, benzylamine and phenylethylamine are preferable.

The aromatic secondary amine compound includes, for example, a diarylamine, an alkylarylamine, and derivatives thereof. The diarylamine includes diphenylamine, N-phenyl-1-naphthylamine, N-phenyl-2-naphthylamine, and derivatives thereof. The alkylarylamine includes N-methylaniline, N-ethylaniline, N-methyl-1-naphthylamine, N-methyl-2-naphthylamine, and derivatives thereof. In particular, in view of easy availability, relatively inexpensive prices, and the like, diphenylamine is preferable.

The heterocyclic secondary amine compound includes aziridine, azetidine, pyrrolidine, piperidine, piperazine, morpholine, and derivatives thereof. In particular, in view of easy availability, relatively inexpensive prices, and the like, the heterocyclic secondary amine compound preferably includes pyrrolidine, piperidine, morpholine, and derivatives thereof.

(Acid Component)

The acid component contributes to the layer repair function. The acid component can include at least an organic carboxylic acid compound. It is preferable that the organic carboxylic acid compound occupies the largest proportion in the acid component. The whole acid component may be the organic carboxylic acid compound. The acid component may include a small amount of another component other than the organic carboxylic acid compound. The component other than the organic carboxylic acid compound is, for example, an inorganic acid, such as phosphoric acid, boric acid, and sulfuric acid.

The organic carboxylic acid compound may include at least one selected from the group consisting of an aromatic carboxylic acid compound and an aliphatic carboxylic acid compound.

The aliphatic carboxylic acid compound includes a saturated aliphatic carboxylic acid, an unsaturated aliphatic carboxylic acid, and the like. Examples of the saturated aliphatic carboxylic acid include oxalic acid, malonic acid, succinic acid, glutaric acid, adipic acid, azelaic acid, sebacic acid, 1,6-decanedicarboxylic acid, 1,7-octanedicarboxylic acid, formic acid, acetic acid, propionic acid, butyric acid, isobutyric acid, valeric acid, caproic acid, enanthic acid, caprylic acid, pelargonic acid, capric acid, lauric acid, myristic acid, stearic acid, and behenic acid. Examples of the unsaturated aliphatic carboxylic acid include acrylic acid, methacrylic acid, maleic acid, fumaric acid, and oleic acid. The aliphatic carboxylic acid compound may be used singly or in combination of two or more kinds.

The aromatic carboxylic acid compound includes, for example, phthalic acid (ortho form), isophthalic acid (meta form), terephthalic acid (para form), benzoic acid, salicylic acid, trimellitic acid, pyromellitic acid, and the like. The aromatic carboxylic acid compound may be used singly or in combination of two or more kinds.

In particular, in view of improving the layer repair function and the thermal stability, the organic carboxylic acid compound preferably includes at least one selected from the group consisting of benzoic acid, adipic acid, azelaic acid, sebacic acid, 1,6-decanedicarboxylic acid, and 1,7-octanedicarboxylic acid. These organic carboxylic acid compounds are suitable for use in a medium- to high-voltage type electrolytic capacitor (e.g., having a rated voltage of 160 V or higher).

The liquid component preferably contains the acid component more abundantly than the base component. The acid component lowers the pH of the liquid electrolyte from the early stage, and suppresses the dedoping of the dopant from the conductive polymer. When the acid component is contained more abundantly than the base component, the dedoping of the dopant from the conductive polymer (deterioration of the solid electrolyte) can be suppressed. Also, from the point that the acid component contributes to the layer repair function of the liquid component, it is preferable that the acid component is contained more abundantly than the base component.

In view of suppressing the dedoping of the dopant from the conductive polymer (suppression of deterioration of the solid electrolyte layer), improving the layer repair function, and the like, the molar ratio of the acid component to the base component: (acid component/base component), is, for example, 1.1 or more, preferably 1.5 or more, more preferably 1.5 or more and 10 or less.

In view of suppressing the dedoping of the dopant from the conductive polymer, and the like, the pH of the liquid component may be 6 or less, and may be 1 or more and 5 or less.

The content of the sum of the acid component and the base component in the liquid component, relative to the whole liquid component, may be, for example, 5 mass % or more and 25 mass % or less, and may be 7 mass % or more and 15 mass % by mass or less. Within the above range, the acid component and the base component can be easily dissociated in the liquid component.

(Solvent)

The solvent can include an organic compound having at least a hydroxy group. The organic compound having a hydroxy group occupies, for example, 5 vol % or more of the solvent, and may occupy 20 vol % or more of the solvent. The whole solvent may be the organic compound having a hydroxy group. The organic compounds having a hydroxy group may be used singly or in combination of two or more kinds.

The organic compound having a hydroxy group preferably includes a polyol compound. The polyol compound preferably includes at least one selected from the group consisting of a glycerin compound and a glycol compound (hereinafter sometimes referred to as a glycerin compound etc.). When the solvent includes a glycerin compound etc., the conductive polymer compound is readily swollen, the orientation of the conductive polymer compound tends to improve, the conductivity of the conductive polymer compound (layer) tends to improve, and the ESR tends to be reduced.

The glycerin compound etc., have a relatively high boiling point, and hardly move outside through the sealing part of the electrolytic capacitor, and thus, the deterioration of the layer repair function due to the decrease of the solvent is suppressed, and, as a result, the increase in leakage current is suppressed. Furthermore, the organic carboxylic acid compound is more likely to interact with the hydroxy group of the glycerin compound etc. than with a phenolic antioxidant having a hydroxy group bonded to an aromatic ring. When the solvent includes a glycerin compound etc., the effect of the organic carboxylic acid compound on the phenolic antioxidant is reduced, and the function of the phenolic antioxidant to suppress the oxidative deterioration of the conductive polymer compound tends to be exhibited efficiently. In particular, a glycerin compound is more preferable, from the point that the interaction with the organic carboxylic acid compound is greater, and the above function of the phenolic antioxidant is allowed to exhibit more efficiently. The mass ratio of the glycerin compound in the solvent may be 20 mass % or more, and may be 25 mass % or more.

The glycerin compound includes glycerin, polyglycerin, and derivatives thereof. Examples of the derivative of glycerin or polyglycerin include an ester in which at least part of the hydroxy groups of glycerin or polyglycerin is esterified, and an alkylene oxide adduct of glycerin or polyglycerin.

Polyglycerin includes a structure of repeating glycerin units. The number of repeating glycerin units included in the polyglycerin is, for example, 2 or more and 20 or less, may be 2 or more and 12 or less, may be 2 or more and 10 or less, and may be 2 or more and 6 or less. Examples of the polyglycerin include diglycerin and triglycerin. The weight average molecular weight of the polyglycerin is, for example, preferably 200 or more and 3000 or less, more preferably 300 or more and 800 or less.

The glycol compound includes an alkylene glycol and the like. Examples of the alkylene glycol include ethylene glycol, propylene glycol, butylene glycol, and hexylene glycol. In particular, ethylene glycol is preferable in that it has low viscosity and can easily dissolve an acid component and a base component. Moreover, ethylene glycol has high thermal conductivity and excellent heat dissipation property, and thus is preferable in improving the heat resistance.

The glycol compound may include a polyalkylene glycol compound. Examples of the polyalkylene glycol compound include polyalkylene glycol, a copolymer having two or more kinds of alkylene oxide units, and a polyalkylene oxide adduct of a polyhydric alcohol. Examples of the alkylene oxide unit include an ethylene oxide (EO) unit and a propylene oxide (PO) unit. Examples of the polyhydric alcohol include glycerin. The weight average molecular weight of the polyalkylene glycol compound is, for example, 100 or more and 3000 or less, and may be 100 or more and 2000 or less. The weight average molecular weight of the polyethylene glycol (PEG) is, for example, 100 or more and 600 or less, and may be 100 or more and 400 or less.

The solvent may include another component other than the organic compound having a hydroxy group. Examples of such a component include a sulfone compound, a sulfoxide compound, a lactone compound, and a carbonate compound.

Examples of the sulfone compound include dimethylsulfone, diethylsulfone, sulfolane, and 3-methylsulfolane. Examples of the sulfoxide compound include dimethylsulfoxide and diethylsulfoxide. Examples of the lactone compound include γ-butyrolactone and γ-valerolactone. Examples of the carbonate compound include dimethyl carbonate, diethyl carbonate, ethylmethyl carbonate, ethylene carbonate, propylene carbonate, and fluoroethylene carbonate. The component other than the organic compound having a hydroxy group may be used singly or in combination of two or more kinds.

In view of the dissociation of a salt formed of an acid component and a base component, the ion conductivity, the heat resistance, and the like, the component other than the organic compound having a hydroxy group is preferably γ-butyrolactone, sulfolane, and dimethyl sulfoxide.

(Antioxidant)

The antioxidant may include at least one selected from the group consisting of a phenolic antioxidant, an amine-based antioxidant, a phosphorus-containing antioxidant, a sulfur-containing antioxidant, and an aliphatic antioxidant. In particular, in view of the reactivity with dissolved oxygen and the like, a phenolic antioxidant is preferable.

The phenolic antioxidant preferably includes at least one selected from the group consisting of a monophenolic antioxidant, a bisphenolic antioxidant, and a polyphenolic antioxidant. In particular, a polyphenolic antioxidant is preferable. When the primary amine compound etc. are used with a polyphenolic antioxidant, the effect to suppress the increase in leakage current tends to be obtained.

The monophenolic antioxidant preferably includes 2,6-di-tert-butyl-4-methylphenol, butylhydroxyanisole, sesamol, tocopherol, tocotrienol, p-nitrophenol, and the like. The monophenolic antioxidant may also include mono-, di-, or tri-(α-methylbenzyl)phenol, trolox, normelatonin, ferulic acid, and the like.

The bisphenolic antioxidant preferably includes anoxomer and the like. The bisphenolic antioxidant may include 2,2'-methylenebis(4-ethyl-6-tert-butylphenol), 2,2'-methylenebis(4-methyl-6-tert-butylphenol), 4,4'-butylidenebis(3-ethyl-6-tert-butylphenol), 4,4'-thiobis(3-ethyl-6-tert-butylphenol), a butylated reaction product of p-cresol and dicyclopentadiene, and the like.

The polyphenolic antioxidant preferably includes gallic acid, propyl gallate, chlorogenic acid, catechin, epigallocatechin, epigallocatechin gallate, rosmarinic acid, genquanin, luteolin, carnosic acid, carnosol, ursolic acid, pyrogallol, quebrazic acid, hydroxytyrosol, dopamine, caffeic acid, adrenaline, noradrenaline, catechol, ushiol, hydroquinone, resorcinol, and the like. Furthermore, the polyphenolic antioxidant preferably includes hydroquinone and a derivative thereof. The derivative of hydroquinone includes 2,5-di-tert-butylhydroquinone, 2,5-di-tert-amylhydroquinone, and the like.

Moreover, the polyphenolic antioxidant may include protocatechuic acid, rutin, gnetin C, theaflavin, luteolin, resveratrol, pinocembrin, pinobanksin, 1,3,5-tris(3,5-di-tert-butyl-4-hydroxybenzyl)-1,3,5-triazin-2,4,6(1H,3H,5H)-trione, 4,4',4"-(1-methylpropanyl-3-ylidene)tris(6-tert-butyl-m-cresol), and the like.

The amine-based antioxidant includes an aromatic secondary amine-based antioxidant, a benzotriazole-based antioxidant, a benzimidazole-based antioxidant, an amine-ketone-based antioxidant, and the like.

The aromatic secondary amine-based antioxidant includes N-phenyl-1-naphthylamine, a diphenylamine-based antioxidant, a phenylenediamine-based antioxidant, and the like. Examples of the diphenylamine-based antioxidant include: an alkylated diphenylamine, such as p,p'-dioctyldiphenylamine; 4,4'-bis(α,α-dimethylbenzyl)diphenylamine; and p-(p-toluenesulfonylamido)diphenylamine. Examples of the phenylenediamine-based antioxidant include N,N'-di-2-naphthyl-p-phenylenediamine, N-phenyl-N'-isopropyl-p-phenylenediamine, N-phenyl-N'-(1,3-dimethylbutyl)-p-phenylenediamine, and N-phenyl-N'-(3-methacryloyloxy-2-hydroxypropyl)-p-phenylenediamine.

The benzotriazole-based antioxidant includes benzotriazole and the like. The benzimidazole-based antioxidant includes benzimidazole, 2-mercaptobenzimidazole, 2-mercaptomethylbenzimidazole, imidazole dipeptide, and the like.

The amine-ketone-based antioxidant includes a 2,2,4-trimethyl-1,2-dihydroquinoline polymer, 6-ethoxy-1,2-dihydro-2,2,4-trimethylquinoline, a reaction product of diphenylamine and acetone, acetylcysteine, melatonin, and the like.

The phosphorus-containing antioxidant includes a phosphate ester-containing antioxidant, a phosphite ester-containing antioxidant, and the like. The ester includes monoalkyl, dialkyl, and trialkyl esters and the like. The phosphite ester-containing antioxidant includes tris(nonylphenyl) phosphite and the like.

The sulfur-containing antioxidant includes a thioether-containing antioxidant, isothiocyanate, sulfurous acid (salt), pyrosulfurous acid (salt), and the like. The thioether-containing antioxidant includes phenothiazine, dibenzyl disulfide, diacetyl sulfide, dilauryl thiodipropionate, and the like.

The aliphatic antioxidant includes citric acid, L-ascorbic acid, erythorbic acid, ethylenediaminetetraacetic acid, and the like.

The antioxidant may be used singly or in combination of two or more kinds. The content of the antioxidant in the liquid component is, for example, 1 mass % or more and 10 mass % or less, relative to the whole liquid component.

(Capacitor Element)

The capacitor element includes, at least, an anode body having a dielectric layer at a surface of the anode body, and a conductive polymer compound covering at least part of the dielectric layer.

In the following, the capacitor element will be specifically described.

(Anode Body)

The anode body can include a valve metal, an alloy containing a valve metal, a compound containing a valve metal, and the like. These materials can be used singly or in combination of two or more kinds. As the valve metal, for example, aluminum, tantalum, niobium, and titanium are preferably used. An anode body having a porous surface can be obtained by, for example, roughening a surface of a base material (e.g., a foil- or plate-like base material) containing a valve metal by etching or other methods. The anode body may be a molded body of valve metal-containing particles or a sintered body thereof. The sintered body has a porous structure.

(Dielectric Layer)

The dielectric layer is formed by anodizing the valve metal at the surface of the anode body by chemical conversion treatment or the like. It suffices as long as the dielectric layer is formed so as to cover at least part of the anode body. The dielectric layer is usually formed at the surface of the anode body. Since being formed at the surface of the porous anode body, the dielectric layer is formed along the inner walls of the pores or the recesses (pits) at the surface of the anode body.

The dielectric layer contains an oxide of the valve metal. For example, when tantalum is used as the valve metal, the dielectric layer contains $Ta_2O_5$, and when aluminum is used as the valve metal, the dielectric layer contains $Al_2O_3$. The dielectric layer is not limited thereto, and may be any one that functions as a dielectric. When the surface of the anode body is porous, the dielectric layer is formed along the surface of the anode body (including the inner walls of the pores).

(Conductive Polymer Compound)

The conductive polymer compound may be, for example, a π-conjugated polymer compound. Examples of the conductive polymer compound include polypyrrole, polythiophene, polyfuran, and polyaniline. These may be used singly or in combination of two or more kinds, and may be a copolymer of two or more kinds of monomers. The weight average molecular weight of the conductive polymer compound is, for example, 1,000 to 100,000.

In the present specification, polypyrrole, polythiophene, polyfuran, polyaniline, and the like mean polymers including polypyrrole, polythiophene, polyfuran, polyaniline, and the like, respectively, as a backbone thereof. Accordingly, polypyrrole, polythiophene, polyfuran, polyaniline and the like can include derivatives of each of them. For example, polythiophene includes poly(3,4-ethylenedioxythiophene).

The conductive polymer compound can be doped with a dopant. The dopant may be a polyanion. Specific examples of the polyanion include polyvinyl sulfonic acid, polystyrene sulfonic acid, polyallyl sulfonic acid, polyacryl sulfonic acid, polymethacryl sulfonic acid, poly(2-acrylamido-2-methylpropanesulfonate), polyisoprene sulfonic acid, poly acrylic acid, and the like. These may be used singly or in combination of two or more kinds. In particular, polystyrene sulfonic acid is preferable.

At least part of the surface of the dielectric layer is covered with a conductive polymer layer (solid electrolyte layer). The conductive polymer layer can contain a dopant together with the conductive polymer compound. In an electrolytic capacitor, the conductive polymer layer constitutes part of a cathode section together with a cathode body. The conductive polymer layer may further contain, as needed, an additive.

The conductive polymer layer can be formed by, for example, chemically and/or electrolytically polymerizing a raw material monomer on the dielectric layer. Alternatively, it can be formed by bringing a solution in which the conductive polymer compound is dissolved, or, a dispersion liquid in which the conductive polymer compound is dispersed, into contact with the dielectric layer. It suffices as long as the conductive polymer layer is formed so as to cover at least part of the dielectric layer.

(Cathode Body)

In the electrolytic capacitor, a cathode body can be disposed so as to face the anode body. Between the anode body and the cathode body, the conductive polymer compound and the liquid component are placed. The cathode body may be a metal foil. The metal may be of any kind, but is preferably a valve metal, such as aluminum, tantalum, and niobium, or an alloy containing a valve metal. A surface of the metal foil may be roughened, as needed. The metal foil may be provided at its surface with a chemical conversion film, or with a surface film of a metal different from the metal constituting the metal foil (i.e., a dissimilar metal) or of a non-metal. Examples of the dissimilar metal and the non-metal include a metal, such as titanium, and a non-metal, such as carbon.

(Separator)

When a metal foil is used as the cathode body, a separator may be disposed between the metal foil and the anode body. As the separator, without limitation, for example, a nonwoven fabric containing fibers of cellulose, polyethylene terephthalate, vinylon, or polyamide (e.g., aliphatic polyamide, aromatic polyamide such as aramid) may be used.

(Others)

The electrolytic capacitor has at least one capacitor element, and may have a plurality of capacitor elements. The number of capacitor elements included in the electrolytic capacitor may be determined according to the use.

(Package Body)

The electrolytic capacitor usually includes a package body that houses a capacitor element and a liquid component. The package body is not limited, and a known package body may be used. An example of the package body includes a bottomed case and a sealing member.

An example of the electrolytic capacitor according to the present embodiment will be specifically described with reference to the drawings. The above-mentioned constituent components can be applied to the constituent components of an example of the electrolytic capacitor described below. The constituent components of an example of the electrolytic capacitor described below can be modified based on the above description. The matters described below may be applied to the above-described embodiments. In an example of the electrolytic capacitor described below, constituent components that are not essential to the electrolytic capacitor of the present embodiment may be omitted.

Figure 2:
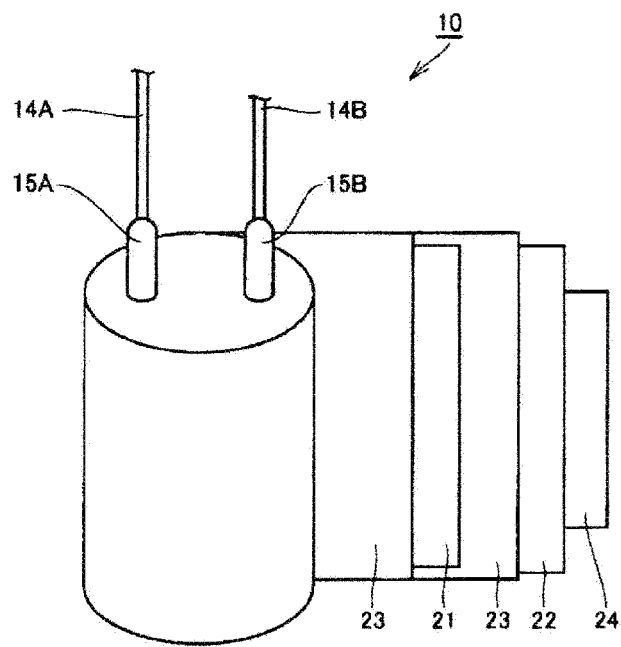
FIG. 2 A schematic illustration for explaining the configuration of a capacitor element according to the same embodiment.

Here, FIG. 1 is a schematic cross-sectional view of an example of the electrolytic capacitor according to the present embodiment. FIG. 2 is a partially-exploded schematic view of a capacitor element according to the above electrolytic capacitor.

The electrolytic capacitor illustrated in FIG. 1 includes a capacitor element 10, a liquid component (not shown), a bottomed case 11 housing the capacitor element 10 and the liquid component, a sealing member 12 closing an opening of the bottomed case 11, a seat plate 13 covering the sealing member 12, lead wires 14A and 14B each extended from the sealing member 12 and passing through the seat plate 13, and lead tabs 15A and 15B each connecting the lead wire and an electrode of the capacitor element 10. The open end of the bottomed case 11 is curled so as to be crimped onto the sealing member 12.

The capacitor element 10 is produced from a wound body as illustrated in FIG. 2. The wound body is a semi-finished product of the capacitor element 10, in which a conductive polymer compound is not yet disposed between an anode body 21 having a dielectric layer at its surface and a cathode body 22. The wound body is formed by winding the anode body 21 connected to the lead tab 15A and the cathode body 22 connected to the lead tab 15B, with a separator 23 interposed therebetween. The outermost layer of the wound body is secured with a winding stop tape 24. FIG. 2 shows a partially exploded state before the outermost layer of the wound body is secured.

The anode body 21 has a metal foil with a roughened surface, and a dielectric layer is formed on the roughened surface. The capacitor element 10 is completed by attaching a conductive polymer compound on at least part of the surface of the dielectric layer.

An exemplary method of manufacturing an electrolytic capacitor will be described below.

(Step of Preparing Anode Body 21 Having Dielectric Layer and Cathode Body 22)

For raw materials of the anode body 21 and the cathode body 22, a metal foil containing a valve metal is used. In the case of the anode body 21, the valve metal is subjected to etching treatment or the like, so that a surface of the metal foil is roughened and a plurality of irregularities are formed on the surface of the metal foil. This is followed by forming a dielectric layer on the roughened surface of the metal foil by chemical conversion treatment or the like. If necessary, a surface of the cathode body 22 may be roughened.

(Step of Fabricating Wound Body)

The anode body 21 and the cathode body 22 are wound with the separator 23 interposed therebetween, to form a wound body. At this time, these may be wound together with the lead tabs 15A and 15B, so that the lead tabs 15A and 15B extend upright from the wound body as illustrated in FIG. 2. The winding stop tape 24 is applied to the outer surface of the cathode body 22 located at the outermost layer of the wound body, to secure the end of the cathode body 22. When a large-sized metal foil is cut and used for the anode body 21, the wound body may be further subjected to chemical conversion treatment, in order to form a dielectric layer on the cut surface of the anode body 21.

(Step of Forming Capacitor Element 10)

For example, a dispersion liquid of a conductive polymer compound is impregnated into the dielectric layer, to form a film of the conductive polymer compound that covers at least part of the dielectric layer. For example, by immersing the wound body in a dispersion liquid of a conductive polymer compound, the film of the conductive polymer compound may be formed. This provides the capacitor element 10 in which a conductive polymer compound is disposed between the anode body 21 and the cathode body 22. The step of applying a dispersion liquid of a conductive polymer compound onto the surface of the dielectric layer may be repeated twice or more. Thereafter, the liquid component is impregnated into the capacitor element 10. This provides an electrolytic capacitor including the conductive polymer compound and the liquid component. When the capacitor element 10 is impregnated with the liquid component, an electrolytic capacitor excellent in the repair function to repair the dielectric layer can be obtained.

(Step of Encapsulating the Capacitor Element)

The capacitor element 10 is housed, together with the liquid component in the bottomed case 11, so that the lead wires 14A and 14B are positioned on the opening side of the bottomed case 11. Examples of the material of the bottomed case 11 include a metal, such as aluminum, stainless steel, copper, iron, and brass, and an alloy thereof. Next, the opening of the bottomed case 11 is closed with the sealing member 12 having the lead wires 14A and 14B passing therethrough, and the opening end is crimped onto the sealing member 12 to be curled, and the seat plate 13 is placed on the curled portion, thereby to obtain an electrolytic capacitor as illustrated in FIG. 1. Thereafter, aging treatment may be performed, under application of a rated voltage.

In the above embodiments, a wound electrolytic capacitor was described, but the scope of application of the present invention is not limited to the above, and can also be applied to other capacitors, for example, a chip-type electrolytic capacitor including a metal sintered body as the anode body, and a laminate-type electrolytic capacitor including a metal plate as the anode body.

The present invention will be more specifically described below with reference to Examples, but the present invention is not limited to the Examples.

Examples 1 to 2, Comparative Examples 1 to 3

In the present Examples, a wound electrolytic capacitor (diameter 10.0 mm×L (length) 20.0 mm) having a rated voltage of 250 W.V (Work Voltage) and a rated capacitance of 7 μF was produced. A specific manufacturing method of the electrolytic capacitor will be described below.

(Preparation of Anode Body)

A 100-μm-thick aluminum foil was subjected to etching treatment, to roughen a surface of the aluminum foil. Thereafter, a dielectric layer was formed at the surface of the aluminum foil by chemical conversion treatment. The chemical conversion treatment was performed by immersing the aluminum foil in an ammonium adipate solution, and applying a voltage of 500 V thereto. Thereafter, the aluminum foil was cut, to prepare an anode body.

(Preparation of Cathode Body)

A 50-μm-thick aluminum foil was subjected to etching treatment, to roughen a surface of the aluminum foil. Thereafter, the aluminum foil was cut, to prepare a cathode body.

(Fabrication of Wound Body)

An anode lead tab and a cathode lead tab were connected to the anode body and the cathode body, respectively, and the anode body and the cathode body were wound, together with the lead tabs, with a separator interposed between the anode body and the cathode body. An anode lead wire and a cathode lead wire were respectively connected to the ends of lead tabs extended from the wound body. The obtained wound body was subjected to chemical conversion treatment again, to form a dielectric layer on the cut end of the anode body. Next, the end of the outer surface of the wound body was secured with a winding stop tape, to complete the wound body.

(Preparation of Polymer Dispersion)

A mixed solution was prepared by dissolving 3,4-ethylenedioxythiophene and polystyrene sulfonic acid (PSS, weight average molecular weight: 100,000) serving as a polymer dopant, in ion-exchanged water. To the mixed solution, under stirring, iron(III) sulfate dissolved in ion-exchanged water (oxidizing agent) was added, to allow a polymerization reaction to proceed. Upon reaction, the obtained reaction solution was dialyzed, to remove unreacted monomers and excess oxidizing agent, so that a polymer dispersion including polyethylene dioxythiophene doped with about 5 mass % of PSS (PEDOT/PSS) was obtained.

(Formation of Conductive Polymer Layer)

In a reduced pressure atmosphere (40 kPa), the wound body was immersed in the polymer dispersion placed in a predetermined container for 5 minutes, and then, the wound body was pulled up from the polymer dispersion. Next, the wound body impregnated with the polymer dispersion was dried in a 150° C. drying oven for 20 minutes, to form a conductive polymer layer covering at least part of the dielectric layer. A capacitor element was thus formed.

(Preparation of Liquid Component)

The acid component and the base component shown in Table 1 were added to a solvent, and mixed, to prepare liquid components a1, a2 and b1 to b3. For the solvent, a mixed solvent containing ethylene glycol (EG) and polyethylene glycol (PEG) (weight average molecular weight MW: 300) in a mass ratio of 25:75 was used. In Table 1, the primary amine in the liquid component a1 is monoethylamine, the secondary amine in the liquid component a2 is diethylamine, the tertiary amine in the liquid component b1 is triethylamine, and the quaternary ammonium in the liquid component b3 is tetraethylamine. The concentration of the acid component in the liquid component was set to 0.56 mol/kg. The concentration of the basic component in the liquid component was set to 0.17 mol/kg. The (acid component/base component) molar ratio was 3.3.

(Assembly of Electrolytic Capacitor)

The above wound body with the conductive polymer layer formed thereon was immersed in the liquid component for 5 minutes in a reduced pressure atmosphere (40 kPa). A capacitor element impregnated with the liquid component was thus obtained. The resulting capacitor element was encapsulated, to complete an electrolytic capacitor as illustrated in FIG. 1. This was followed by aging treatment at 125° C. for 90 minutes, under application of a voltage of 300 V.

A1 and A2 in Table 1 are electrolytic capacitors of Examples 1 and 2 including the liquid components a1 and a2, respectively. B1, B2 and B3 are electrolytic capacitors of Comparative Examples 1 to 3 including the liquid components b1, b2 and b3, respectively.

Examples 3 and 4, Comparative Examples 4 to 6

In the preparation of a liquid component, an antioxidant was added to the liquid component. The antioxidant used here was pyrogallol. The content of the antioxidant in the liquid component was set to 3 mass %, relative to the whole liquid component. Except for the above, liquid components a3 and a4 and liquid components b4 to b6 were obtained in the same manner as the liquid components a1 and a2 and the liquid components b1 to b3, respectively.

Electrolytic capacitors A3 and A4 of Examples 3 and 4 and electrolytic capacitors B4 to B6 of Comparative examples 4 to 6 were obtained in the same manner as the electrolytic capacitor A1 of Example 1, respectively, except that the liquid components a3 and a4 and the liquid components b4 to b6 were used instead of the liquid component a1.

Example 5

A liquid component a5 was obtained in the same manner as the liquid component a4, except for using, as the solvent, a mixed solvent containing glycerin (GL) and polyethylene glycol (PEG) (weight average molecular weight MW: 300) in a mass ratio of 25:75. An electrolytic capacitor A5 of Example 5 was obtained in the same manner as the electrolytic capacitor A1 of Example 1, except that the liquid component a5 was used instead of the liquid component a1.

The following evaluations were performed using the electrolytic capacitors A1 to A5 and B1 to B6 obtained above.

[Evaluation 1: Measurement of Leakage Current]

A rated voltage was applied to the electrolytic capacitor in a 20° C. environment, and a leakage current after a lapse of 2 minutes (leakage current in the early stage) was measured. Next, the electrolytic capacitor was left to stand at 145° C. for 250 hours. Thereafter, a leakage current after left to stand for 250 hours was measured in a similar manner to the above.

[Evaluation 2: Measurement of ESR]

In a 20° C. environment, an initial ESR (Z0) at a frequency of 100 kHz of the electrolytic capacitor was measured using an LCR meter for four-terminal measurement. Next, while a rated voltage was applied to the electrolytic capacitor in a 145° C. environment, the electrolytic capacitor was held for 2000 hours. In a similar manner to the above, an ESR (Z1) of the electrolytic capacitor after held at 145° C. was measured. Using the initial ESR (Z0) and the ESR (Z1) after held at 145° C., ΔESR (rate of change in ESR) was determined from the following formula.

$$\Delta ESR\ (\%) = 100 \times (Z1-Z0)/Z0$$

The evaluation results are shown in Tables 1 and 2.

TABLE 1

| | | Liquid component | | | | Evaluation | | |
| | | | | | | Leakage current (μA) | | |
| Electrolytic capacitor | Liquid component | Solvent | Acid component | Base component | Antioxidant | Initial | After 250 h | Δ ESR (%) |
|---|---|---|---|---|---|---|---|---|
| A1 | a1 | EG + PEG | benzoic acid | primary amine | Without | 0.95 | 7.76 | 13 |
| A2 | a2 | EG + PEG | benzoic acid | secondary amine | Without | 0.87 | 8.56 | 12 |
| B1 | b1 | EG + PEG | benzoic acid | tertiary amine | Without | 0.98 | 28.66 | 24 |
| B2 | b2 | EG + PEG | benzoic acid | ammonia | Without | 1.34 | 167.43 | 46 |
| B3 | b3 | EG + PEG | benzoic acid | quaternary ammonium | Without | 1.21 | 11.08 | 76 |

TABLE 2

| Electrolytic capacitor | Liquid component | Liquid component | | | | Evaluation | | |
|---|---|---|---|---|---|---|---|---|
| | | Solvent | Acid component | Base component | Antioxidant | Leakage current (μA) | | Δ ESR (%) |
| | | | | | | Initial | After 250 h | |
| A3 | a3 | GL + PEG | benzoic acid | primary amine | With | 0.98 | 8.14 | 8 |
| A4 | a4 | GL + PEG | benzoic acid | secondary amine | With | 0.83 | 8.77 | 7 |
| A5 | a5 | GL + PEG | benzoic acid | secondary amine | With | 0.92 | 4.78 | 3 |
| B4 | b4 | GL + PEG | benzoic acid | tertiary amine | With | 1.23 | 30.98 | 22 |
| B5 | b5 | GL + PEG | benzoic acid | ammonia | With | 1.56 | 183.45 | 33 |
| B6 | b6 | GL + PEG | benzoic acid | quaternary ammonium | With | 1.43 | 15.88 | 57 |

In the electrolytic capacitors A1 to A5, the increase in leakage current after left to stand for a long time was suppressed, and a small ΔESR was obtained. In A4 and A5 in which an antioxidant was used, the ΔESR was further small. In the electrolytic capacitor A5 in which GL was included in the liquid component, the increase in leakage current and the rise in ESR were further suppressed.

In the electrolytic capacitors B1 to B6, the leakage current increased after left to stand for a long time, and the ΔESR increased.

INDUSTRIAL APPLICABILITY

The present invention is applicable to electrolytic capacitors, and is preferably applicable to an electrolytic capacitor for which small leakage current and low ESR are required.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

10: capacitor element, 11: bottomed case, 12: sealing member, 13: seat plate, 14A, 14B: lead wire, 15A, 15B: lead tab, 21: anode body, 22: cathode body, 23: separator, 24: winding stop tape

The invention claimed is:

1. An electrolytic capacitor, comprising:
a capacitor element; and
a liquid component, wherein:
the capacitor element includes an anode body having a dielectric layer at a surface of the anode body, and a conductive polymer compound covering at least part of the dielectric layer,
the liquid component contains an acid component, a base component, and a solvent,
the solvent includes an organic compound having a hydroxy group,
the acid component includes an organic carboxylic acid compound,
the base component includes at least one first base component selected from the group consisting of a primary amine compound and a secondary amine compound,
the primary amine compound is at least one aliphatic primary amine compound selected from the group consisting of monoethylamine, n-propylamine, and isopropylamine,
the secondary amine compound is at least one aliphatic secondary amine compound selected from the group consisting of N-methylethylamine, N-methylpropylamine, N-methylisopropylamine, N-ethylpropylamine, N-ethylisopropylamine, and dipropylamine, diisopropylamine,
the at least one first base component occupies the largest proportion in the base component, and
a sum of ammonia, tertiary amines, and quaternary ammoniums in the base component is 0 mass % or more and 2 mass % or less.

2. The electrolytic capacitor according to claim 1, wherein the organic carboxylic acid compound includes at least one selected from the group consisting of an aromatic carboxylic acid compound and an aliphatic carboxylic acid compound.

3. The electrolytic capacitor according to claim 1, wherein the organic compound having a hydroxy group includes a polyol compound.

4. The electrolytic capacitor according to claim 1, wherein the liquid component contains an antioxidant.

5. The electrolytic capacitor according to claim 1, wherein a molar ratio of the acid component to the base component is 1.5 or more.

6. The electrolytic capacitor according to claim 1, having a rated voltage of 160 V or higher.

7. An electrolytic capacitor, comprising:
a capacitor element; and
a liquid component, wherein:
the capacitor element includes an anode body having a dielectric layer at a surface of the anode body, and a conductive polymer compound covering at least part of the dielectric layer,
the liquid component contains an acid component, a base component, a solvent, and an antioxidant,
the base component includes at least one first base component selected from the group consisting of a primary amine compound and a secondary amine compound,
the primary amine compound is at least one aliphatic primary amine compound selected from the group consisting of monoethylamine, n-propylamine, and isopropylamine,
the secondary amine compound is at least one aliphatic secondary amine compound selected from the group consisting of N-methylethylamine, N-methylpropylamine, N-methylisopropylamine, N-ethylpropylamine, N-ethylisopropylamine, and dipropylamine, diisopropylamine, the at least one first base component occupies the largest proportion in the base component, and a sum of ammonia, tertiary amines, and quaternary ammoniums in the base component is 0 mass % or more and 2 mass % or less.

8. The electrolytic capacitor according to claim 7, wherein the antioxidant includes at least one selected from the group consisting of a phenolic antioxidant, an amine-based antioxidant, a phosphorus-containing antioxidant, a sulfur-containing antioxidant, and an aliphatic antioxidant.

9. The electrolytic capacitor according to claim 8, wherein the phenolic antioxidant includes at least one selected from the group consisting of a monophenolic antioxidant, a bisphenolic antioxidant, and a polyphenolic antioxidant.

10. The electrolytic capacitor according to claim 7, wherein the acid component includes an organic carboxylic acid compound.

11. The electrolytic capacitor according to claim 7, wherein the solvent includes an organic compound having a hydroxy group.

12. The electrolytic capacitor according to claim 11, wherein the organic compound having a hydroxy group includes a polyol compound.

13. The electrolytic capacitor according to claim 12, wherein the polyol compound includes a glycerin compound.

14. The electrolytic capacitor according to claim 7, wherein a molar ratio of the acid component to the base component is 1.5 or more.

15. The electrolytic capacitor according to claim 7, having a rated voltage of 160 V or higher.

16. An electrolytic capacitor, comprising:

a capacitor element; and a liquid component, wherein:

the capacitor element includes an anode body having a dielectric layer at a surface of the anode body, and a conductive polymer compound covering at least part of the dielectric layer, the liquid component contains an acid component, a base component, and a solvent, the solvent includes ethylene glycol and polyethylene glycol, the acid component includes benzoic acid, the base component includes at least one first base component selected from the group consisting of a primary amine compound and a secondary amine compound, the primary amine compound is monoethylamine, the secondary amine compound is dimethylamine, the at least one first base component occupies the largest proportion in the base component, and a sum of ammonia, tertiary amines, and quaternary ammoniums in the base component is 0 mass % or more and 2 mass % or less.

17. An electrolytic capacitor, comprising:

a capacitor element; and a liquid component, wherein:

the capacitor element includes an anode body having a dielectric layer at a surface of the anode body, and a conductive polymer compound covering at least part of the dielectric layer, the liquid component contains an acid component, a base component, an antioxidant, and a solvent, the solvent includes glycerin and polyethylene glycol, the acid component includes benzoic acid, the base component includes monoethylamine or dimethylamine, the antioxidant includes pyrogallol;

the at least one first base component occupies the largest proportion in the base component, and a sum of ammonia, tertiary amines, and quaternary ammoniums in the base component is 0 mass % or more and 2 mass % or less.

* * * * *